United States Patent Office 3,594,208
Patented July 20, 1971

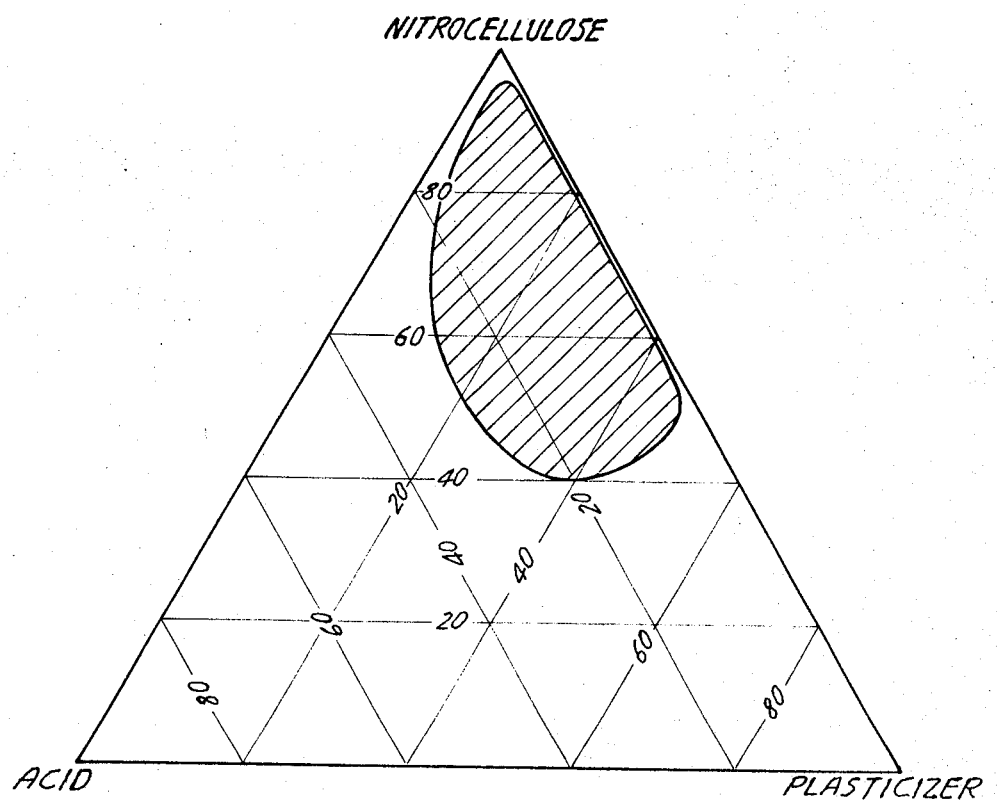

3,594,208
HEAT SENSITIVE COLOR PROJECTION TRANSPARENCY BLANK AND METHOD OF MAKING
Joseph A. Wiese, Jr., St. Paul, John R. Berg, Roseville, and Donald J. Williams, White Bear Lake, Minn., assignors to Minnesota Mining and Manufacturing Company, St. Paul, Minn.
Filed June 16, 1969, Ser. No. 833,642
Int. Cl. B41m 5/18
U.S. Cl. 117—36.8
7 Claims

ABSTRACT OF THE DISCLOSURE

An integral film for making long-lived color projection transparencies by thermographic copying techniques comprises a first coating of a color progenitor in a vinyl halide resin binder and a firmly retained heat-resistant and permanently clear and transparent second coating of an acidic reactant in a plasticized nitrocellulose binder.

SPECIFICATION

This invention relates to the projection of colored images and more particularly to clear transparent film materials useful in the preparation of color projection transparencies by methods involving simple thermographic heating. The products of the invention find particular utility in the preparation of projection transparencies for use on the overhead projector.

The preparation of color projection transparencies has previously been described. In the application of Berg and Wiese, Ser. No. 590,211 filed Oct. 26, 1966, now U.S. Pat. No. 3,483,013, there is described a two-sheet system in which an acidic reactant is thermographically transferred at heated image areas from an acid source sheet to a transparent receptor sheet containing a protonatable chromogenous dye-forming color progenitor in solution in a vinyl chloride polymer, to form a color projection image. The source sheet is then removed. The color projection transparency retains both its image color and its initial background clarity under extended exposure on the overhead projector.

The present invention achieves a similar result in terms of permanency of background and image, but in a simplified manner, by combining both the acidic reactant coating and the color progenitor coating in a single integral sheet. A color-forming reaction between the two reactants occurs only upon heating the sheet, e.g. in the thermographic copying process. The additional cost, and the inconvenience of assembling and dis-assembling, of the two-sheet couplet is eliminated. A long-lived color projection transparency is obtained.

Premature reaction between the two reactant components is avoided by applying the second or acid-containing coating from solution in a volatile liquid vehicle which is a non-solvent for the vinyl chloride polymer of the first coating.

Adequate adhesion to vinyl chloride polymers normally requires either a preliminary surface treatment or the inclusion in the second coating of some solvent material capable of attacking the polymeric surface. It has now been found possible to attain the required high level of bonding to the vinyl chloride polymer first coat by using nitrocellulose as the film-forming binder of the second coat, without any preliminary treatment and using a solvent for the nitrocellulose, such as methyl alcohol, which is completely inert toward the vinyl film.

Unfortunately, the organic acid reactant materials tend to crystallize from a nitrocellulose binder and to form light-diffusing crystalline deposits within the film, or to exude or form a "bloom" on the surface. In either case the clarity of the product is reduced and image projection is impaired. The effect is noticeable even with minimal concentrations of acid required to produce acceptable color formation, e.g. with as low as one percent of salicylic acid. At larger percentages the crystallization effect is intensified.

The incorporation of a plasticizer for the nitrocellulose is found to prevent crystallization of the acid without impairing the bond to the vinyl resin. However both the plasticizer and the acid exert a softening and stickiness-imparting effect on the nitrocellulose at elevated temperatures, and when used in moderately large amounts are found to cause undesirable picking or transfer of fibers or ink particles from printed originals during thermographic copying. The particles or fibers embedded in the colored image areas cause diffusion or absorption of the light beam and a dark image is obtained on the projection screen.

The present invention provides an integral copy-sheet for making color projection transparency copies of graphic originals by thermographic copying procedures. The resulting transparencies withstand continuous exposure on the overhead projector for several hours without significant image fading or background discoloration. The copy remains clear and transparent at both image and background areas. Offsetting of the colored coating to the original, or picking of fibers or ink particles from the original to the coating, is avoided during the copying procedures.

The practice of the invention will for convenience now be described in terms of an illustrative example, wherein all proportions are indicated in parts by weight unless otherwise noted.

EXAMPLE

A first solution is prepared by dissolving one part of "Color Precursor No. 1" and 20 parts of "Vinylite VYHH" in 69 parts of methylethyl ketone, and if necessary adding a small amount of a five percent solution, of potassium hydroxide in ethanol, sufficient to bring the pH to 7. The solution is coated on clear transparent two mil "Mylar" polyester film at a uniform thickness to provide, after drying, a coating weight of .45 gm./sq. ft.

A second solution containing four parts of ½ second nitrocellulose, one part of alcohol-soluble polyvinyl butyral resin, and one part of 5-chlorosalicyclic acid in 21 parts of methyl alcohol is prepared and is applied over the first coating and dried at room temperature. The added dry coating weight is .40 gm./sq. ft.

The coated film is clear and colorless. It is placed with the coated surface against the printed surface of a graphic original which is then briefly exposed through the film to intense infra-red radiation in a thermographic copying machine. An intense clear blue image corresponding to the printed image is formed on the copy-sheet. The sheet is placed on an overhead projector and is found to project a cyan image with a clear background on the viewing screen. The visual pattern remains substantially unchanged during several hours of continuous projection.

"Color Precursor No. 1" is N-bis(4-dimethylaminophenyl)methyl pyrrolidone. It produces a cyan image, as above stated. Various N-bis(p-dialkylaminoaryl) methane derivatives are useful, as indicated in the Berg-Wiese application. A magenta image is obtained with Color Precursor No. X4406. Color Precursor No. X4405 converts to an intense yellow from an initially pale yellow, or the same color may be obtained using an initially substantially colorless carbamate derivative of the X4405 material. Mixtures of these protonatable color-formers may be employed to obtain color projection images of any desired intermediate color.

"Vinylite VYHH" resin is a copolymer of 87 parts vinyl chloride and 13 parts vinyl acetate. Other neutral polymers of monomers including at least about 75% but not more than 95% of vinyl chloride are also useful. If coated on a removable carrier, the vinyl polymer film containing the color progenitor may itself serve as the backing but preferably is permanently supported on a separate heat-resistant film such as the polyester film of the example. For such coatings, between about 15 and about 45 parts of resin may be used with one part of the dye-former.

The 5-chlorosalicylic acid of the example is a preferred acid. Other useful acids include benzoic, p-aminobenzoic, citric, cyanoacetic, gallic, salicyclic, 5-bromosalicyclic, 2,4-dichloromaleic. Acids having a pKa value between two and five are generally effective. The acid must be soluble in the nitrocellulose solution, and should melt or preferably volatilize at temperatures reached in the thermographic copying process.

Although both solid and liquid plasticizers may be used, the polymeric non-migrating materials provide maximum stability and are preferred. The plasticizer must be compatible with the nitrocellulose and serve to solubilize or prevent crystallization of the acid, and must be soluble in the solvent employed. It should be essentially nonvolatile under normal storage and use of the sheet. "Butvar B-76" polyvinyl butyral as used in the example is particularly effective, but other classes of plasticizers are also useful, as represented for example by "Paraplex G-62" polyester, "Flexol B-400" polyalkylene glycol, and camphor.

The ability of the coated sheet to resist picking and offsetting during the thermographic copying procedure may be conveniently measured by means of a simple test procedure. A heated metal panel having a measured progressively increasing surface temperature along its length, such as a "Heizbank" hot bench, is used as the heat source. The transparent coated film is placed against a printed original and the two are uniformly lightly pressed against the metal surface for ten seconds under hand pressure and then removed and cooled. Slowly stripping the film from the original under constant inspection then discloses the point at which adhesion, picking and offsetting first occur; and the corresponding temperature is ascertained from the position of the film on the heated surface. Sheets which exhibit no such defects at up to about 160° C., or preferably up to about 190-200° C., are found to be fully acceptable for use in the thermographic copying process.

Using the test procedure just described, it has now been found that compositions containing about one to about 25 percent or slightly higher or preferably about 5 to 15 percent, of acid, about five to about 50 percent of polymeric plasticizer, and about 40 to about 94 percent of nitrocellulose, and further coming within the proportions indicated by the shaded area of the appended triangular coordinate drawing, are capable of forming well-bonded, non-crystallizing and heat-resistant topcoatings on the supported or unsupported vinyl halide polymer sub-coatings as herein described, to provide integral copy-sheet materials with which to prepare clear transparent long-lasting color projection transparencies.

What is claimed is as follows:

1. A clear transparent heat-sensitive integral sheet material useful in the preparation of a color projection transparency by thermographic copying procedures and including a first layer of a protonatable chromogenous dye-forming color progenitor in a vinyl chloride polymer binder, and a coating firmly bonded to said first layer and consisting essentially of about 40 to 94 percent by weight of nitrocellulose, about 5 to 50 percent of a plasticizer for said nitrocellulose, and about 1 to 25 percent of an organic acid reactive with said progenitor, the proportions of said nitrocellulose, plasticizer and dye being further defined as lying within the shaded area of the accompanying drawing.

2. The sheet material of claim 1 wherein said first layer is permanently supported on a transparent heat-resistant polymeric film.

3. The sheet material of claim 2 wherein said plasticizer is a non-migrating polymeric plasticizer.

4. The sheet material of claim 3 wherein said plasticizer is polyvinyl butyral.

5. The sheet material of claim 4 wherein said acid is a salicyclic acid.

6. The sheet material of claim 5 wherein said acid is present in an amount of about 5 to 20 percent.

7. The method of making a clear transparent heat-sensitive integral sheet material useful in the preparation of a color projection transparency by thermographic copying procedures, said method comprising coating a clear transparent heat-resistant film backing with a liquid coating composition containing a protonatable chromogenous dye-forming color progenitor and a polymer of monomers including 75-95% of vinyl chloride in a volatile liquid vehicle, drying the coating, applying a second coating of a liquid coating composition containing about 40 to 94 percent nitrocellulose, about 5 to 50 percent plasticizer, and about 1 to 25 percent organic acid all dissolved in a volatile liquid vehicle which is a non-solvent for said polymer, and drying said second coating under conditions which inhibit any significant reaction between said progenitor and said acid, and wherein the composition of the dried second coating falls within the shaded area of the accompanying drawing.

References Cited

UNITED STATES PATENTS 3,094,620   6/1963   Reitter.
3,483,013   12/1969   Berg et al.

MURRAY KATZ, Primary Examiner

U.S. Cl. X.R.

117—36.9, 76, 86, 138.8